(No Model.)
A. M. HANNA & L. J. WALKER.
COMBINED FERTILIZER DISTRIBUTER AND PLANTER.
No. 462,548. Patented Nov. 3, 1891.
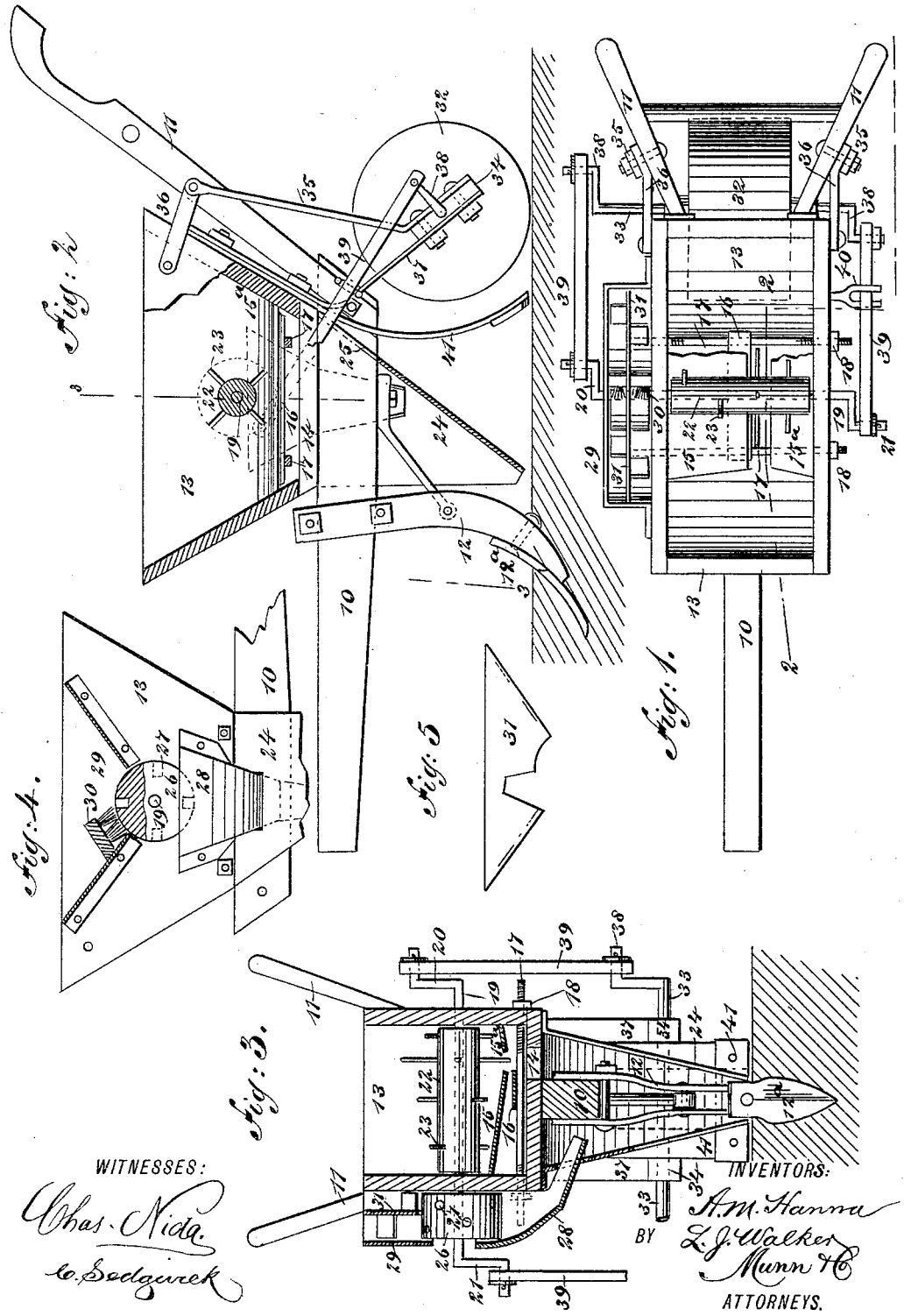

UNITED STATES PATENT OFFICE.

ANDREW M. HANNA AND LEWIS J. WALKER, OF KOSCIUSKO, MISSISSIPPI.

COMBINED FERTILIZER-DISTRIBUTER AND PLANTER.

SPECIFICATION forming part of Letters Patent No. 462,548, dated November 3, 1891.

Application filed August 5, 1891. Serial No. 401,727. (No model.)

*To all whom it may concern:*

Be it known that we, ANDREW M. HANNA and LEWIS J. WALKER, of Kosciusko, in the county of Attala and State of Mississippi, have invented a new and Improved Combined Fertilizer-Distributer and Planter, of which the following is a full, clear, and exact description.

Our invention relates to an improvement in agricultural implements, and has for its object to provide a combined fertilizer-distributer and seed-planter so constructed that one character of seed may be planted and fertilizer distributed at the same time with the seed, or wherein two kinds of seed may be planted, dropped alternately, and fertilizer supplied at the same time.

Another object of the invention is to provide an implement capable of attachment to an ordinary plow-beam, and to construct said attachment in a simple, durable, and economic manner.

A further object of the invention is to provide a slide-valve capable of being positively and safely locked in a predetermined position to permit more or less of the fertilizing material to escape from the hopper.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the implement. Fig. 2 is a vertical longitudinal section taken practically on the line 2 2 of Fig. 1. Fig. 3 is a transverse section taken essentially upon the line 3 3 of Fig. 2. Fig. 4 is a side elevation of the hopper to contain fertilizing material and a section through the seed-hopper, disclosing the seed-carrier; and Fig. 5 is a detail view of the partition, whereby the seed-hopper may be divided into compartments to receive two kinds of seed.

The attachment may be applied, as heretofore stated, to any style of plow.

In the drawings, a plow-beam 10 is represented as supporting the hopper of the implement, the said beam being provided with the usual handles 11 and plowshare 12ª, the shank 12 of which is secured to the beam in any approved manner. At the back of the plow-shank the hopper 13, adapted to contain fertilizing material, is placed. This hopper extends about equidistant beyond opposite sides of the beam, as shown in Fig. 3, and at one side of the beam the hopper is provided with an outlet aperture or opening 14, which extends from end to end of its bottom portion. The hopper is ordinarily provided with flaring ends, whereby the bottom is of less width than the top. The hopper is further provided with a false or auxiliary bottom made in two sections 15 and 15ª. The section 15 is of greater width than the section 15ª, and a space is made to intervene the two sections immediately above the opening 14, as shown in Fig. 3, and the sections of the auxiliary bottom are so arranged that they incline downward in direction of the said opening 14.

Through the space between the sections of the false or auxiliary bottom the fertilizing material contained in the hopper is adapted to escape, and from thence passes down through the opening 14 in the main bottom. The quantity of material to be discharged from the hopper is regulated by a slide-valve 16. This slide-valve consists primarily of a plate extending from end to end of the hopper, and the said plate near its extremities is firmly attached to the upper faces of screw-rods 17, which rods pass through the sides of the hopper, one near each end, and are provided upon their projecting extremities with nuts 18. It will thus be observed that by unscrewing one nut and screwing up the opposite nut of each screw-rod the valve may be carried in a direction to nearly uncover or to completely uncover the opening 14 in the hopper, or partially close it, and that when once the valve has been adjusted as to position, it will remain so, even though the implement is subjected to hard usage or to severe vibration.

In the hopper 13, at the center thereof, a shaft 19 is transversely journaled, the ends whereof extend beyond the sides of the hopper, and the said shaft terminates ordinarily at one end in a crank-arm 20; but, if in practice it is found desirable, an oppositely-disposed crank-arm 21 may be formed at its opposite end. Upon this shaft, within the hopper, a drum 22 is secured, the said drum being provided with a series of teeth 23, radiating from its periphery, the said teeth being preferably stepped or staggered. The toothed drum as the shaft 19 revolves is adapted to stir the fertilizing material, breaking and pulverizing it, and several of the teeth which are longer than the others pass downward into the space intervening the sections of the auxiliary bottom, compelling the material filling this space to pass downward and outward therefrom.

Upon the under side of the fertilizer-hopper a chute 24 is attached, which chute is forwardly inclined and is located immediately back of the plow-shank 12, as shown in Fig. 2, and the front of this chute is ordinarily open. The chute is provided at the upper portion of its rear end with an opening 25, in which opening the plow-beam 10 passes when the implement is in position thereon.

At one side of the fertilizer-hopper the shaft 19 has attached thereto a seed-distributing wheel 26, the said wheel being provided in its peripheral surface with a series of pockets 27, which pockets are so arranged that they are divided into two circumferential groups, and the pockets in one group are staggered with respect to those in the opposite group. Thus a pocket in one group will receive seed while a pocket in the opposite group is just about to discharge seed. This seed-wheel 26 is located partially within the upper portion of a spout or chute 28, which at its lower end enters the main spout or chute 24, the entrance being effected at the side of the main chute opposite that at which the fertilizer is discharged therein.

Above the seed-wheel a hopper 29 is detachably attached to the sides of the main or fertilizer hopper 13, and the seed-wheel revolves partially within this hopper. The hopper 29 contains a fixed brush 30, extending transversely thereof and engaging with the periphery of the seed-wheel, the function of the brush being to sweep from the wheel any surplus seed. The seed-hopper 29 is provided with a detachable partition 31, whereby it is divided into two compartments, and the division is made from the central peripheral surface of the seed-distributing wheel. Thus in each compartment a group of wheel-pockets is presented as the seed-wheel revolves, and peas, for instance, may be placed in one compartment of the seed-hopper and corn may be located in the opposite compartment. This partition is made removable in order that seed of one kind only may be planted, if in practice it is found desirable.

At the rear of the plow-beam a wheel 32 is located adapted to travel upon the surface of the ground. This wheel is secured upon a shaft 33, which is journaled in boxes 34, supported by bracket-arms 35, attached at their upper ends to the sides of the handles of the plow, and the fertilizer-hopper is held in position upon the beam by links 36, one of which is located at each side attached at one end of the side faces of the hopper and at their opposite ends to the outer faces of the handles 11, preferably through the medium of the bolt securing to the said handles the upper ends of the bracket-arms 35. The boxes 34 also receive support through the medium of another set of bracket-arms 37, which bracket-arms are secured to the rear end of the hopper receiving the fertilizing material, the bracket-arms 35 being attached to the upper portion of the journal-boxes and the bracket-arms 37 to the lower faces thereof, as is best shown in Fig. 2.

The driving-wheel shaft 33 is provided at one or at both ends with crank-arms 38. If a crank-arm is formed at one end only of the shaft it is connected by a pitman 39 with a crank-arm of the upper shaft 20, carrying the stirring-drum and also revolving the seed-distributing wheel, and when but one pitman is employed to convey motion from the drive-wheel to the operative portions of the implement, the said pitman is passed between the tines of a fork 40, secured preferably at its inner end to one of the bracket-arms, the lower one 37, for instance. The tines of the fork, which we term a "guide-fork," are so twisted that the pitman is continually thrown by the tines off of its center, and no dead-center is possible. This fork may be dispensed with, if found desirable, and two pitmen be employed, one at each side of the machine, in which event crank-arms are formed at both ends of the upper shaft 19 and the lower wheel or drive-shaft 33.

A spring-drag 41 is attached at its upper end to the back of the main hopper 13, the said drag being curved downwardly and rearwardly and comprising two side arms and a lower cross-bar.

We desire it to be distinctly understood that the implement may be readily removed from the plow-beam when attached thereto by disconnecting the links 36 from the handles of the plow, and likewise the bracket-arms 35, and removing the main hopper 24, after which the seed-boxes and their attached attachments may be readily lifted from the plow-beam.

In operation, as the implement is drawn forward, seed will pass from the seed-hopper into one side of the main chute 24, and at the same time fertilizing material will enter said chute from its opposite side, and, mingling with the seed, both seed and fertilizing material will enter the ground together.

The distance that the hills are to be apart may be regulated by stopping up sundry of the pockets in the seed-distributing wheel.

The supporting-wheel may be placed in front of the plow, or two wheels may be employed, one in front and the other back of the plow.

Having thus described our invention, we claim as new and desire to secure by Letters Patent—

1. In an implement of the character described, the combination, with a plow-beam, its shank and share, of a hopper located upon the plow-beam at the rear of the shank, extending beyond opposite sides of the beam, and provided with an opening in its bottom at one side, an auxiliary bottom located in the hopper, comprising two spaced sections, the space being over the opening in the bottom of the hopper, a slide-valve located between the main bottom and the auxiliary bottom, adapted to close the opening or space between the sections of the auxiliary bottom, a shaft journaled in the hopper and carrying a toothed drum, a crank-shaft having a supporting-wheel secured thereto, and a pitman connection between the crank-shaft and the drum-shaft, substantially as shown and described.

2. In an implement of the character described, the combination, with a plow-beam, its shank and share, of a hopper located upon the plow-beam at the rear of the shank, extending beyond opposite sides of the beam, and provided with an opening in its bottom at one side, an auxiliary bottom located in the hopper, comprising two spaced sections, the space being over the opening in the bottom of the hopper, a slide-valve located between the main bottom and the auxiliary bottom, adapted to close the opening or space between the sections of the auxiliary bottom, a shaft journaled in the hopper and carrying a toothed drum, a crank-shaft having a supporting-wheel secured thereto, a pitman connection between the crank-shaft and the drum-shaft, and a fork secured to the frame-work of the implement the tines of which are twisted, the said pitman being passed between the tines of the fork, whereby the pitman is thrown from off its center, as and for the purpose set forth.

3. In an implement of the character described, the combination, with a plow-beam, its shank and share, a hopper located upon the plow-beam at the rear of the plow-shank, extending beyond opposite sides of the beam, and provided with an opening in its bottom at one side, an auxiliary bottom located in the hopper and constructed in two sections having a space intervening them, screw-rods located in the hopper between its main and false bottom and having suitable nuts at their extremities, and a slide-valve attached to the said screw-rods adapted to close and to disclose the space intervening the sections of the auxiliary bottom, of a spout attached to the bottom of the hopper extending downward around the plow-beam, a shaft journaled in the hopper above the auxiliary bottom and provided with a series of teeth, a seed-distributing wheel secured upon one end of the shaft and provided with two circumferentially-arranged series of pockets staggered with respect to each other, a hopper located above the wheel, provided with a removable partition, a chute located below the wheel and entering the chute attached to the main hopper, a drive-shaft, a wheel secured upon the drive-shaft and adapted to travel upon the ground, and a pitman connection between the drive-shaft and the shaft revolving in the hopper, as and for the purpose set forth.

4. In an implement of the character described, the combination, with a plow-beam, its shank and share, a hopper located upon said beam at the rear of the shank, extending beyond opposite sides thereof, and provided with an opening in its under face at one side of the beam, a false bottom contained in the hopper and constructed in sections having a space intervening them, a screw-controlled slide-valve adapted to close and to disclose the opening in the false bottom, and a chute attached to the bottom of the hopper and extending downward around the plow-beam, of a seed-distributing wheel secured to a shaft journaled in the hopper and provided with a series of pockets in its periphery, a hopper located above the seed-wheel and containing a removable partition, a chute located beneath the seed-wheel and entering the main chute, a toothed drum secured to the shaft journaled in the main hopper, a spring-drag secured to the hopper and extending downward at the rear of its main chute, a drive-shaft, a drive-wheel secured upon said shaft, a fixed fork the tines of which are twisted, and a pitman connection between the drive-shaft and the drum or hopper-shaft, which pitman passes between the tines of the fork, as and for the purpose set forth.

ANDREW M. HANNA.
LEWIS J. WALKER.

Witnesses:
  W. B. TURNAGE,
  B. T. HANNA.